(12) United States Patent
Patel

(10) Patent No.: US 10,429,005 B2
(45) Date of Patent: Oct. 1, 2019

(54) MOUNT FOR LUBRICANT DISPENSER

(71) Applicant: PERMA-TEC GmbH & CO. KG, Euerdorf (DE)

(72) Inventor: Shalin Patel, Bad Kissingen (DE)

(73) Assignee: PERMA-TEC GMBH & CO. KG, Euerdorf (DE)

( * ) Notice: Subject to any disclaimer, the term of this patent is extended or adjusted under 35 U.S.C. 154(b) by 294 days.

(21) Appl. No.: 15/464,791

(22) Filed: Mar. 21, 2017

(65) Prior Publication Data

US 2017/0191616 A1 Jul. 6, 2017

Related U.S. Application Data

(62) Division of application No. 14/589,209, filed on Jan. 5, 2015, now abandoned.

(30) Foreign Application Priority Data

Jan. 7, 2014 (DE) .................... 20 2014 100 049 U

(51) Int. Cl.
*F16N 99/00* (2006.01)
*B67D 3/00* (2006.01)
*F16N 11/00* (2006.01)
*F16N 7/00* (2006.01)

(52) U.S. Cl.
CPC ........... *F16N 99/00* (2013.01); *B67D 3/0032* (2013.01); *B67D 3/0083* (2013.01); *F16N 7/00* (2013.01); *F16N 11/00* (2013.01)

(58) Field of Classification Search
CPC .... B67D 3/008; B67D 3/0083; B67D 3/0032; B67D 3/0035; F16N 7/00; F16N 11/00; F16N 99/00
See application file for complete search history.

(56) References Cited

U.S. PATENT DOCUMENTS

| | | | | |
|---|---|---|---|---|
| 1,810,836 A | * | 6/1931 | Laubenstein | A47G 23/0241 248/300 |
| 2,200,024 A | * | 5/1940 | De Sipio | A47K 5/12 222/162 |
| 3,193,146 A | * | 7/1965 | Isgriggs | B05C 17/00516 222/326 |
| 3,719,305 A | * | 3/1973 | Pressnell | A47G 23/0233 215/395 |
| 4,254,926 A | * | 3/1981 | Reeberg | F16N 13/08 248/152 |
| 4,326,648 A | | 4/1982 | Kieber | |
| D265,508 S | * | 7/1982 | Rusteberg | D24/128 |
| 4,557,452 A | * | 12/1985 | Khuong | B60N 3/103 248/214 |
| D304,670 S | * | 11/1989 | Johnson | D8/71 |
| 4,969,580 A | | 11/1990 | Mikhail | |
| 5,023,074 A | | 1/1991 | Morton et al. | |

(Continued)

*Primary Examiner* — Minh Truong
(74) *Attorney, Agent, or Firm* — Andrew Wilford

(57) ABSTRACT

These objects are attained in a mount for a lubricant dispenser and that has a protective casing forming a cavity adapted to hold the dispenser and having a lower edge and a bracket having a lower generally horizontal leg on which the lower edge of the casing sits. An outlet fitting is provided on the lower leg positioned to received lubricant from the dispenser in the cavity of the casing sitting on the lower leg.

11 Claims, 13 Drawing Sheets

(56) References Cited

U.S. PATENT DOCUMENTS

| | | | | |
|---|---|---|---|---|
| 5,361,950 | A | * | 11/1994 | Signal .................... B60N 3/103 224/482 |
| 5,704,495 | A | * | 1/1998 | Bale ....................... A61B 50/20 211/71.01 |
| 5,833,194 | A | * | 11/1998 | Jones ..................... B60N 3/103 248/311.2 |
| 6,345,723 | B1 | * | 2/2002 | Blake .................. A47G 23/0241 211/73 |
| 6,698,601 | B1 | * | 3/2004 | Nez ....................... F16M 13/02 211/70.6 |
| D659,302 | S | * | 5/2012 | Rose ........................... D30/121 |
| 8,272,611 | B2 | * | 9/2012 | Schmidt .................. A47K 5/12 211/77 |
| 9,282,817 | B2 | * | 3/2016 | Yates ................... A47B 81/005 |
| D790,249 | S | * | 6/2017 | Park ............................. D6/540 |
| 9,670,051 | B1 | * | 6/2017 | Onda ................... B67D 3/0083 |
| 10,180,267 | B2 | * | 1/2019 | Bober ....................... F24H 9/06 |

* cited by examiner

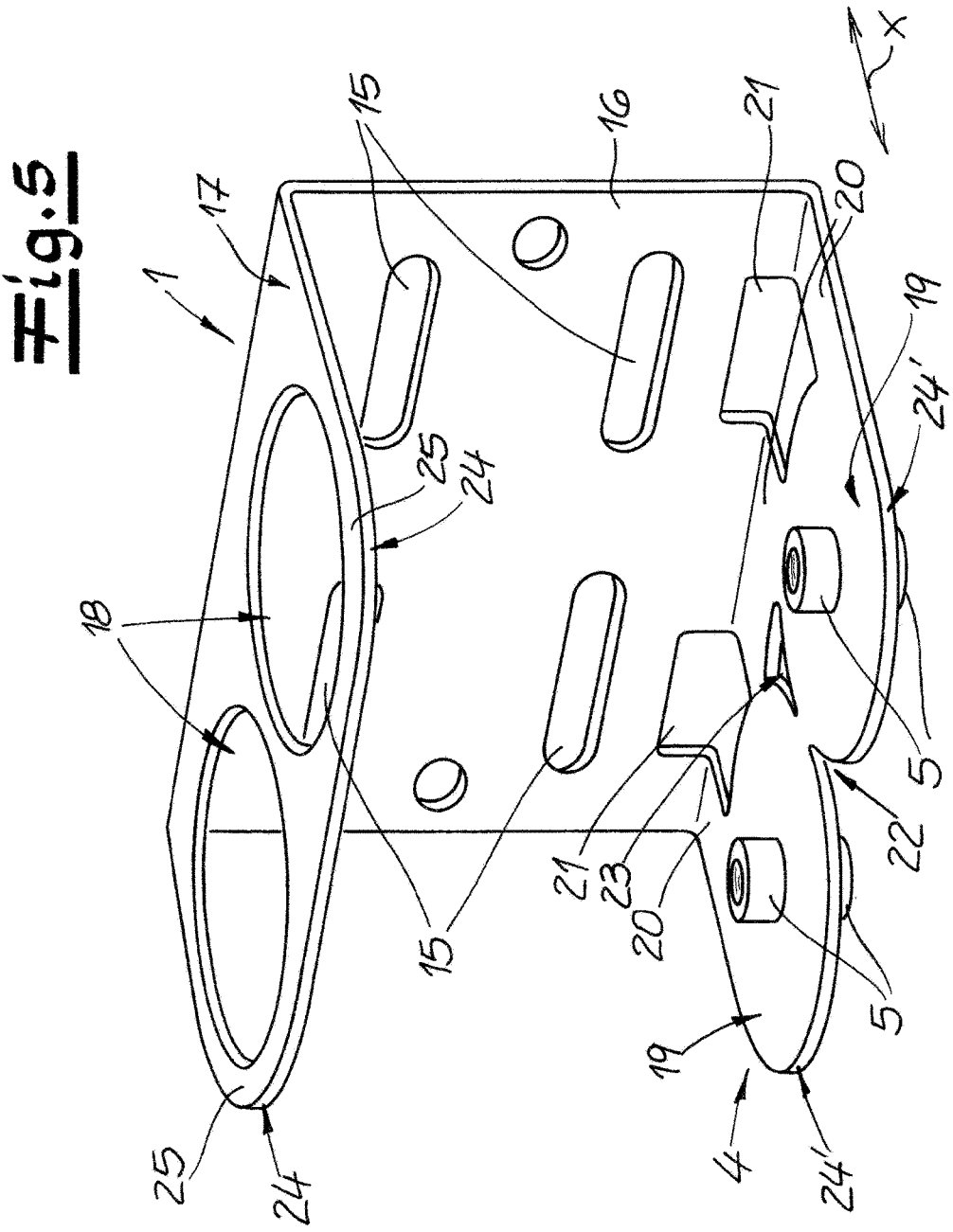

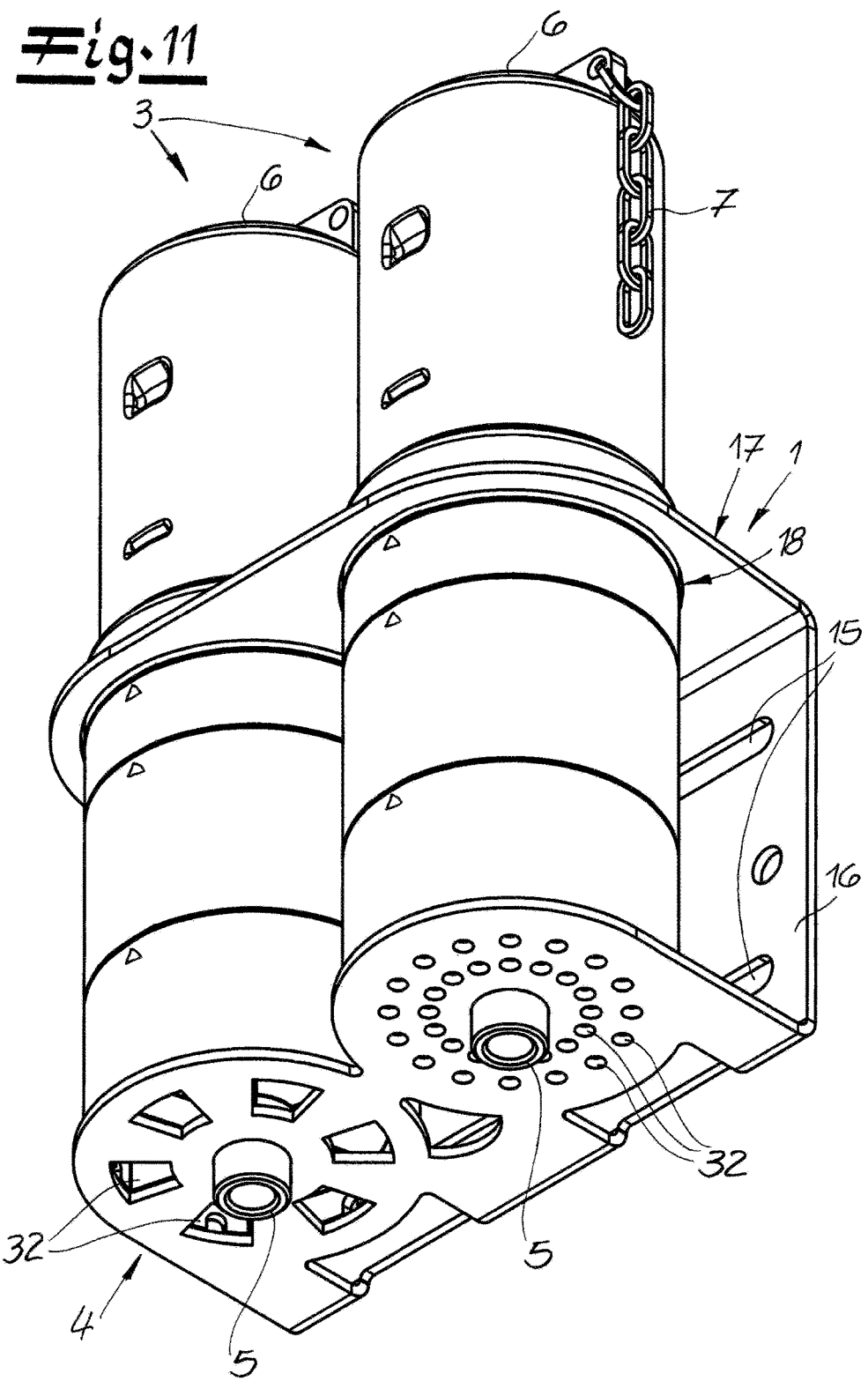

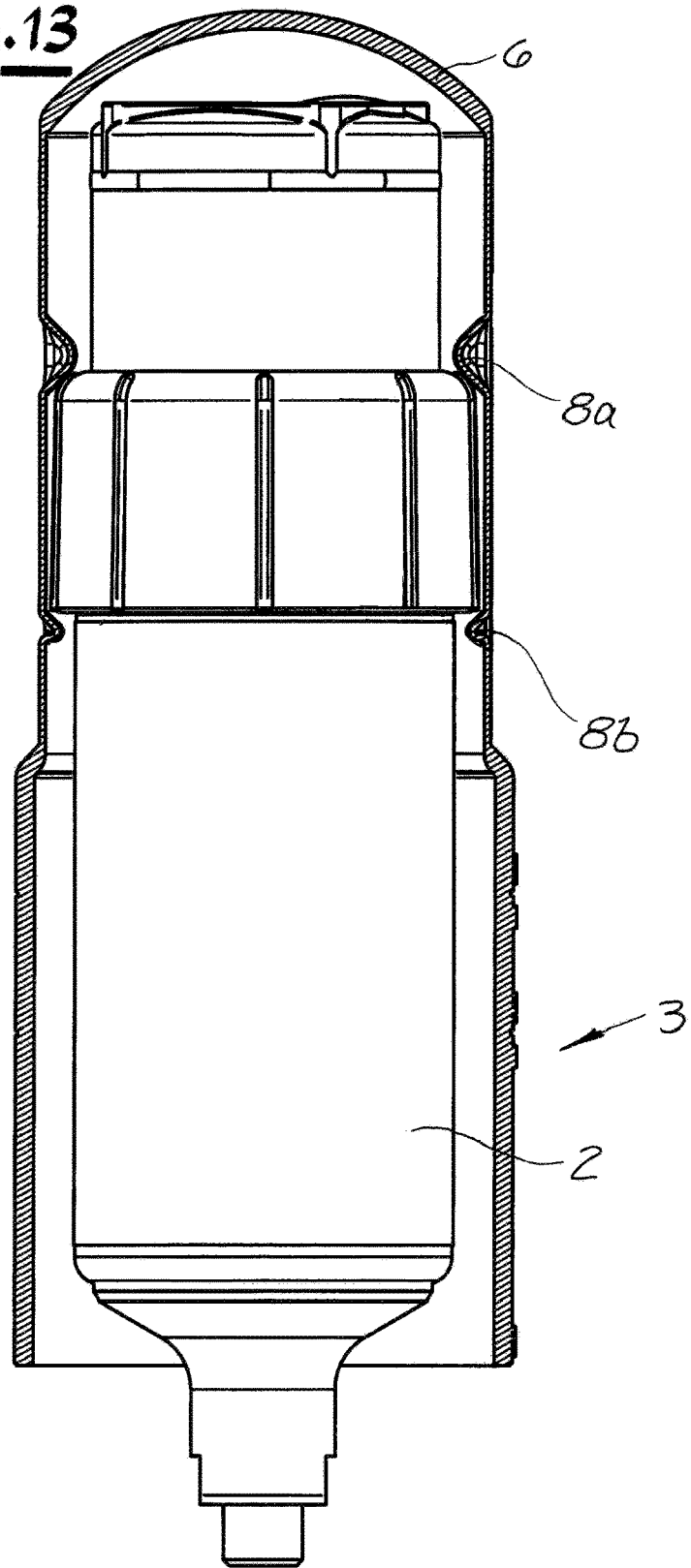

MOUNT FOR LUBRICANT DISPENSER

CROSS REFERENCE TO RELATED APPLICATIONS

This application is a division of U.S. patent application Ser. No. 14/589,209 filed 5 Jan. 2015 with a claim to the priority of German application 20 2014 100 049.6 filed 7 Jan. 2014.

FIELD OF THE INVENTION

The present invention relates to a mount for a lubricant dispenser. More particularly this invention concerns an automatic dispenser for liquid lubricant.

BACKGROUND OF THE INVENTION

A lubricant dispenser is known in the industry and is used, for example, for the precise grease lubrication of system parts such as rolling and sliding bearings, linear guides, chains or the like. For example, the lubricant dispenser is connected to a lubrication point of a bearing and can deliver lubricant as a function of the running time of a machine or at predetermined intervals.

Such a lubricant dispenser can be manufactured according to different designs. A lubricant reservoir is frequently emptied by a piston, it being possible for the piston to be driven electromechanically by a motor or by formation of a pressure cushion. The formation of a pressure cushion can particularly be achieved through the electrochemical release of a gas whose generation rate usually is preset using an electrical circuit or varied using the electrical circuit. Finally, a pressure cushion can also be built up by direct chemical decomposition in order to actuate the piston.

Various lubricant such dispenser designs are known from DE 10 2012 100 035, US 2014/0224837, US 2013/0206511, US 2011/0315485 and US 2009/0038888.

The described lubricant dispensers usually have an approximately cylindrical shape, with the lubricant emitted at an outlet port. It is known to attach lubricant dispensers directly by their outlet port to a device to be lubricated, to which end the outlet port is usually provided with a screw connection from which a hose leads to the element being lubricated.

For reasons of operational safety or space, the described lubricant dispensers are often also attached to a support and are then connected to a point to be lubricated via the hose.

The attachment of the lubricant dispenser can be done by simple metallic tracks, clamps, pipe clamps or the like.

Particularly under harsh use conditions, however, the known lubricant dispenser mounts for fixation to a support have proven fragile, it being necessary to consider various criteria in a harsh environment. Particularly, the lubricant dispenser must be protected to the greatest possible extent from damage by collision with an object. For example, if the lubricant dispenser is attached to a support, people or objects moving by the support can bump against the lubricant dispenser and damage it. Apart from losing further function of the lubricant dispenser as a result of the damage, the danger also exists, in particular, of uncontrolled leaking of the lubricant. What is more, the lubricant dispenser should be protected to the greatest possible extent from mechanical stress of any kind and the accumulation of contaminants.

OBJECTS OF THE INVENTION

It is therefore an object of the present invention to provide an improved mount for a lubricant dispenser.

Another object is the provision of such an improved mount for a lubricant dispenser that overcomes the above-given disadvantages, in particular that ensures improved protection of the lubricant dispenser particularly under harsh use conditions.

SUMMARY OF THE INVENTION

These objects are attained in a mount that has according to the invention a protective casing forming a cavity adapted to hold the dispenser and having a lower edge, a bracket having a lower generally horizontal leg on which the lower edge of the casing sits, and an outlet fitting on the lower leg positioned to received lubricant from the dispenser in the cavity of the casing sitting on the lower leg.

The bracket is provided, on the one hand, in order to carry the lubricant dispenser and support it from below and, on the other hand to enable attachment of the lubricant dispenser to a support. The bracket can particularly be L- or C-shaped seen from the side, one preferred embodiment of the C-shaped bracket, to which inherent inventive surplus is given, being explained below in further detail.

The bracket can be provided either for one lubricant dispenser or even for several lubricant dispensers provided next to one another, it being possible to provide a respective lubricant fitting for each lubricant dispenser. The lubricant fitting can be embodied, for example, as a threaded sleeve in order to screw the lubricant dispenser to it. Moreover, a simple hole can also be embodied as a lubricant fitting, however, in which case a suitable attachment of the lubricant dispenser to the hole must be provided. For example, the lubricant dispenser can be secured in the hole by a lock nut or the like.

According to the invention, the bracket has a lower leg in which the lubricant fitting is provided. Apart from the fact that the lower leg carries and supports the lubricant dispenser, the lower leg also ensures a certain protection of the lubricant dispenser because it extends beyond the footprint of the lubricant dispenser so that objects or the like impacting from the side can be held away to a certain degree by the lower leg.

According to the invention, the separate protective casing is also fitted down over the lubricant dispenser, thus forming a cylindrical cavity for the lubricant dispenser. The protective casing is fitted to the dimensions of the lubricant dispenser such that the protective casing rests with a lower edge on the lower leg of the bracket. The lubricant dispenser is thus protected in an especially simple manner over its entire height, the protective casing also providing a certain seal at the lower leg on its edge due to its inherent weight.

It must be considered here that the lubricant dispensers themselves generally have a housing made of a relatively thin-walled material, particularly plastic. This is particularly true if a lubricant reservoir is a component of the lubricant dispenser in the form of a separate cartridge, in which case low manufacturing costs for the disposable cartridge are particularly required.

Moreover, it is common for a portion of the lubricant dispenser that can also be equipped with an actuator for the delivery of lubricant to be reused. Even if a more stable housing is used for this and, depending on the design, no danger exists of the lubricant leaking out, the actuators increase the vulnerability of this component.

In relation to the invention, a separate protective casing is provided that also protects the lubricant dispenser from the outside and can also easily be reused.

If the bracket is set up for holding several lubricant dispensers, it is not out of the question in principle for a single protective casing to be provided for the several lubricant dispensers provided next to each other. According to a preferred embodiment of the invention, however, a respective separate protective casing is provided for each lubricant dispenser.

The protective casing then has a cylindrically tubular that forms a cavity, the protective casing being closed at its upper end and resting with its open lower edge on the lower leg of the bracket.

As regards the concrete design of the bracket and protective casing, the invention provides for a wide range of structural possibilities.

For example, the protective casing can have inwardly oriented projections in the cavity for gripping the protective casing on the lubricant dispenser. In principle, such projecting bumps can be provided for different purposes. On the one hand, the projections can be provided in combination with the bracket in order to eliminate radial play.

Alternatively, it is also possible to mount the lubricant dispenser without the bracket directly at a point to be lubricated, for example near a bearing or the like. If the lubricant dispenser is thus used without the bracket, the protective casing can also not be held in a predetermined position by its lower edge. For such an arrangement, the projections can be coordinated with the lubricant dispenser such that the casing is held in a kind of snap-on connection on the lubricant dispenser. In particular, projections can also be provided at different heights of the protective casing, so that part of the lubricant dispenser is solidly gripped.

As described above, the protective casing is preferably closed at its upper end in order to protect the lubricant dispenser from above as well. In such an embodiment, the upper end of the protective casing is especially preferably convex, so that contaminants can be diverted from the upper end of the casing. This also results in improved protection from above. For example, if objects fall down onto the protective casing or the protective casing is subjected to other mechanical loads from above, they can be diverted laterally to a certain extent and thus reduced. A convex shape also imparts better stability to the protective casing itself, so that it is better protected against destruction under a heavy load.

The protective casing can be made of various materials. Metal and plastic are particularly worth considering, and parts of the lubricant dispenser can, in principle, also be made of different materials.

In particular, it can be advantageous if the protective casing is at least partly transparent so that the lubricant dispenser or at least portions of the lubricant dispenser protectively held in the cavity remain visible. Particularly, it can be advantageous if the fill level of a lubricant reservoir and/or of an indicator of the lubricant dispenser is visible through the protective casing. For this purpose, the lubricant dispenser can be made of a transparent plastic, in which case not only a completely clear, transparent embodiment but also a slightly milky, opaque one is also worthy of consideration. Particularly in the case of simple optical displays in the form of LEDs, cloudy or opaque plastic can be sufficient to a certain extent. In contrast, if a scale or detailed information of a display need to be read, a transparent embodiment is advantageous.

As already explained above, it is also possible for only parts of the protective casing to be transparent. For this purpose, opaque metallic materials or even opaque plastics can be combined with transparent materials. Besides transparent plastics, glass windows can also be considered that are also available in highly durable forms.

If the lubricant dispenser is at least partly transparent, additional measures can be taken in order to provide good UV protection for outdoor use nonetheless. For example, a UV absorber can be added to a transparent plastic or even to glass, with UV-absorbing layers, films or coatings also being worthy of consideration.

If the protective casing is made at least partly of a plastic, one with a high level of durability is preferably used. Examples of suitable plastics are polyester, polyamide and polyacrylate, with plastic mixtures or laminated embodiments also being possible in principle. For example, the protective casing can be formed by injection molding, including multicomponent injection molding. Moreover, it is also possible to use a reinforced plastic, particularly a particle- or fiber-reinforced plastic. Suitable reinforcement materials are particularly fibers such as carbon fibers, glass fibers or even natural fibers.

Lubricant dispensers of different sizes are known in the industry. For instance, it is known that different lubricant dispensers of a product series or even lubricant dispensers of different product series can have an approximately similar cross sectional shapes but different lengths. In a two-part lubricant dispenser, for example, a reusable part can be combined with a drive with cartridges of different length in order to make the appropriate amount of lubricant available for a specific application.

Against this background, in order to enable adaptation of the protective casing to lubricant dispensers of different lengths, the protective casing can optionally be shortened. For this purpose, indicia can be provided on the appropriate place on the protective casing. In addition or alternatively, a weak or predetermined breaking point can also be produced through a localized reduction in wall thickness. The protective hood can then easily be shortened to the desired length. An additional marking is then advantageously provided at every weak point with which a user can make the appropriate adaptation to a certain lubricant dispenser. For example, length information, product abbreviations or the like can be provided at the weak points of the protective casing.

The wall thickness of the protective casing can be adapted to requirements and expected loads, it also being possible to provide different wall thicknesses for different parts of the protective casing. In particular, the protective casing can have a smaller wall thickness in an upper region of the cavity than in a lower region of the cavity.

As described above, the protective casing rests with its lower edge on the lower leg of the bracket. In a preferred cylindrical form, the lower leg is of circular shape and has a larger diameter, however, in order to support the lower edge of the protective casing. The oversize is advantageously several millimeters, for example between 1 mm and 10 mm, in order to securely carry the protective casing. On the other hand, an even greater overhang is disadvantageous depending on the application, because the dimensions of the bracket are unnecessarily increased in this way, and the accumulation of dirt is promoted.

The protective casing is fitted down over the lubricant dispenser and rests with its lower edge on the lower leg of the bracket. The protective casing is thus also held and fixed in this way to a certain extent. However, in order to use this as a point of departure for enabling improved play-free or mostly play-free securing of the protective casing on the lower leg, a centering member can be provided on the lower leg of the bracket and within the cavity in order to align the protective casing relative to the bracket. The centering member can be a bracket or disk that itself has a central passage or a hole on the lubricant fitting or on the lubricant connection of the lubricant dispenser.

As a centering member, a sheet metal part can be considered, for example that is aligned with a middle annular section on the lubricant fitting and, starting from there, has several, preferably at least three, tabs that fix the protective casing in the desired position. With the diameter predetermined by the interior space of the protective casing, for example, the tabs can be bent upward in order to fix the interior wall of the protective casing. Particularly in the case of a design using sheet metal, the tabs can also be resilient, and a ridge or a groove can also be provided near the lower edge of the protective casing that is connected positively to the bent tabs. The ends of the upwardly bent tabs can be bent back inwardly in order to provide guidance or centering on fitting of the protective casing to the bracket.

Alternatively, a disk, particularly a disk made of plastic, can be provided as a centering member through which the protective casing is pushed. In such an embodiment as well, a positive and/or clamping can be achieved by ridges or grooves on the inside of the protective casing, in which case the disk can also have, in addition or alternatively, an edge shape that supports the connection. In addition to individual detents distributed around the periphery, circumferential ridges or the like can also be considered.

If the protective casing is not only radially positioned by the centering member but rather also protected from lifting to a certain extent through clamping or a positive fit, the protective casing is fixed securely on the bracket even under external loads. In this way, the danger of external influences such as gusts of wind, lateral impacts or other mechanical loads lifting or moving the protective casing is reduced.

As regards the specific embodiment of the described construction, various designs are possible. The disk can merely be interposed as a single element. It is also possible, however, for the disk to also comprise a threaded sleeve to which a lubricant hose or the like can be connected. The lubricant fitting on the lower leg can also be a simple hole, thus resulting in an especially low manufacturing expense.

Finally, the disk can also be provided on its edge with a seal. For example, a lip made of the plastic of the disk that is radially resilient to a certain extent is worthy of consideration. In addition or alternatively, a separate seal ring can also be provided, to which end an O-ring is inserted for example into a circumferential groove of the disk.

According to another aspect of the invention, the lower leg can have holes beneath the cavity. Particles of dirt, liquids or the like can be discharged downward through these holes. The embodiment of holes in the lower leg can especially be considered if no heavy soiling from splatter or the like from below can be expected in the respective application. In principle, it is also possible for the holes to merely be formed in the lower leg initially and then broken out depending on the specific application. If the lower leg is provided with holes as described, the above-described disk provided for the purpose of centering can also be adapted accordingly. The disk can also have cutouts on its lower edge so that particles of dirt, liquids or the like collecting on the outer periphery of the disk can be discharged downward.

The protective casing can be removed for maintenance purposes, particularly for changing the lubricant dispenser or at least one lubricant reservoir of the lubricant dispenser, even if it is held to a certain extent by a centering member. To prevent the protective casing from then becoming lost when removed, the protective casing can also be provided with a safety cord, chain or the like. Such a safety chain or safeguarding cord can be attached, for example, to an eye of the protective casing, the eye being provided in a suitable location, for example on the upper end of the protective casing. When the protective casing is then hanging on the safeguarding cord or on the safety chain, the open upper edge points downward so that no dirt can penetrate from above into the removed protective casing.

In one simple embodiment, the bracket can be L-shaped as seen from the side, in which case only one bent leg, typically bent by 90°, is then at a lower edge of a wall fastening plate. This fastening plate can then be provided with a slot or even several holes or slots in order to enable attachment of the fastening plate and hence the entire bracket with screws, hooks or the like to a support.

According to a preferred embodiment of the invention, the bracket is C-shaped as seen from the side. The bracket then has the fastening plate on whose upper edge a projecting upper leg is provided that has at least one hole for fitting around the lubricant dispenser and on whose lower edge the lower leg is arranged in a projecting manner.

As with the above-described C-shaped design of the bracket, it is preferably made entirely or in large part of sheet metal. In particular, the fastening plate, the upper leg and the lower leg are formed together out of sheet metal, although a separate sleeve can be used, for example glued or welded in, near the lubricant fitting.

The object underlying the invention, namely better protection of the lubricant dispenser, is achieved according to another, independent aspect of the invention by the combination of a generally cylindrical lubricant dispenser centered on an upright axis and having on the axis a downwardly open outlet with a bracket having an upright wall plate provided with formations for attachment to a support and having an upper edge and a lower edge, an upper leg projecting horizontally from the upper edge and formed with a hole through which extends the dispenser, and a lower leg projecting horizontally from the lower edge, supporting the dispenser, and forming a protective part having an area equal to at least 80% of the hole. The upper and lower legs both have outer corners remote from the plate and rounded back toward the plate over at least a third of a horizontal projection of the respective leg from the plate. The bracket is formed at a corner at the lower edge between the plate and the lower leg with a throughgoing aperture. The combination further comprises a feedthrough fitting on the lower wall engaged with the outlet of the dispenser.

The fastening plate and the two legs preferably projecting horizontally at a right angle therefrom result in a C-shaped structure when seen from the side. The at least one lubricant dispenser or several lubricant dispensers provided next to each other are each connected and fastened to a respective lubricant fitting of the lower leg, the usually cylindrical lubricant dispenser also being inserted above on the upper leg into the respective hole and thus being protected peripherally by the upper leg. The upper leg thus forms a framework for the at least one lubricant dispenser so to shield the lubricant dispenser itself from impacts to a certain extent.

According to the present invention, other measures are also provided that, in combination, enable especially good and reliable protection of the lubricant dispenser or, in the case of a mount for several lubricant dispensers, especially reliable protection of the lubricant dispensers.

The lower leg is formed with at least one protective part for each lubricant dispenser that extends over at least 80% of the surface of the hole. Preferably, the protective part is designed in coordination with the lubricant dispenser to be supported such that the protective part projects past a footprint of the usually approximately cylindrical lubricant dispenser. The protective part shields the lower end of the lubricant dispenser, on which a discharge or outlet hole connected to the lubricant fitting is usually located, both downward and to the side. In the event of a lateral collision of a person or object with the lubricant dispenser mount, the resultant impact is absorbed by the upper leg enclosing the lubricant dispenser and by the protective part of the lower leg, thus preventing the lubricant dispenser itself from being touched.

Although the lower leg has a surface that provides protection of the lubricant dispenser or of the lubricant dispensers through the formation of the protective parts, at least one aperture is provided at a corner between the fastening plate and the lower leg. A corner between the fastening plate and the leg can be formed by angle or an arch. By virtue of the aperture in this region, the accumulation of contaminants there can be prevented. Liquids, particles of dirt or the like can be drop through the aperture. In particular, in the event of heavy soiling, the lubricant dispenser mount can also be washed or sprayed off with the at least one lubricant dispenser on it, in which case can flow or drip down through the aperture.

The aperture is preferably a throughgoing window. In relation to the invention, this means that the aperture is bordered around its entire periphery by the material of the lower leg and/or the material of the fastening plate. However, the aperture need not lie in a plane. Rather, it is advantageous if the aperture extends near the corner or corner partly both in the lower leg and in the fastening plate.

Finally, corner rounding is provided on the free end of the upper leg and on the free end of the lower leg that extend over at least a third of the length of the upper leg and of the lower leg as measured in the longitudinal direction.

In principle, it is known to provide sharp corners with a rounding in order to avoid sharp edges. According to the invention, however, the upper leg and the lower leg have very large corner rounding. This is informed by the insight that a laterally impacting object or person can also be diverted or redirected in the direction of the free end of the leg by corner rounding that is as large as possible. Depending on the impact position and the impact angle, the forces exerted as a result can thereby be substantially reduced, thus further reducing the risk of damaging of the at least one lubricant dispenser. The corner rounding embodied according to the invention also prevents the accumulation of dirt.

According to a preferred embodiment of the invention, the hole is circular, the radius of the corner rounding at the upper leg being greater or equal to the radius of the hole. Particularly, the hole on the one hand and the corner rounding on the other hand can be formed around a common center of curvature, which is typically the center axis of the dispenser, its outlet, and the casing. The upper leg then forms, near the corner rounding, a protective, arcuate web that typically extends over a quarter circle. Such a protective web, with a shape that is as soft and round as possible, also ensures reliable protection of the lubricant dispenser being held.

In addition or alternatively, the protective part can have a circular shape. The lower leg can then be formed exclusively of the at least one protective part and connecting webs that, laterally of the at least one aperture, connect the protective part to the fastening plate.

The upper leg and the lower leg with the at least one protective part can have approximately the same area. Preferably, the protective part—apart from the lubricant fitting—covers at least the area of the hole provided above it.

This ensures that a cylindrical lubricant dispenser or a cylindrical protective hood that is inserted through the hole does not project over the associated protective part and is thus optimally protected.

The lubricant dispenser mount can be provided without restriction for holding a plurality of lubricant dispensers that then are provided next to each other. At least two holes are then provided next to each other on the upper leg, and at least two protective parts are provided beneath the holes on the lower leg. An appropriate number of lubricant dispensers to be held is selected based on the respective need. Particularly, the lubricant dispenser mount can be designed for two, three or four lubricant dispensers.

If the lubricant dispenser mount according to the described preferred embodiment of the invention has at least two protective parts, window-like holes can be formed between the protective parts. In this context as well, "window-like" means that the hole is formed within the material of the lubricant dispenser mount and is thus bordered around its entire periphery. There is no limitation to the actual geometric shape. If both of the adjacent protective parts are circular, for example, this results in a kind of rounded triangular shape.

Moreover, indentations can also be formed between the protective parts at the free end of the lower leg. The window-like holes and the indentations contribute to reducing the amount of dirt that can collect and facilitates cleaning of the corresponding contaminants from the lower leg.

To enable easy manufacture, the fastening plate, the upper leg and the lower leg can all be formed from a single metal sheet. Manufacture from a metal sheet can be done in an especially simple manner by first stamping the flat sheet and then bending it into the desired shape.

There are several possibilities for the lubricant fitting within the scope of the invention. For example, it is conceivable for a simple hole to be provided, with an outlet of the lubricant dispenser being connected directly to a lubricant line at the lubricant fitting and so that the lubricant dispenser is thus fixed to the lower leg.

Alternatively, the lubricant fitting can also be the fitted to outlet of the lubricant dispenser and to the lubricant line so that they are connected to each other through the lubricant fitting. For this purpose, the lubricant fitting can be for example an internally threaded sleeve. Such a sleeve can be adhered or welded to the lower leg, depending on the material.

If the lower leg is made of sheet metal, such a thread can also be made during manufacture by a tap. The lubricant dispenser mount then forms not only a single, continuous part but is then formed entirely from a single piece of sheet metal.

If the fastening plate, the upper leg and the lower leg are made of sheet metal, it is preferably a high-quality steel in order to also prevent corrosion over the long term. In addition or alternatively, the metal sheet can also be provided with a protective layer, to which end paint, a powder coating or galvanization are worthy of consideration.

According to the invention, the fastening plate has mounting holes with which the lubricant dispenser mount can be fastened to a support. According to a preferred embodiment of the invention, the fastening plate has at least four slots that preferably extend horizontally.

Through the arrangement of two slots over each other and next to each other, two anchor clips can also be used accordingly in different manners. With two anchor clips provided next to each other, for example, attachment to a horizontal support is possible. Likewise, through the arrangement of the anchor clips over each other, fixation to a vertical support is made possible. Finally, by virtue of the embodiment with slots, it is also possible to attach the lubricant dispenser mount to an oblique support.

Moreover, instead of anchor clips, simple hooks made of sheet metal can also be provided in order to hang the lubricant dispenser mount on a lattice, for example. The fastening hooks can preferably be mounted on a flat part of the fastening plate, and an upper hook can be formed by bending. At their lower end, the fastening hooks can also be bent in the direction of the lower leg in order to better bear the weight of the lubricant dispenser mount and the lubricant dispensers accommodated therein.

The object of the invention is also a lubricant dispenser arrangement with the above-described lubricant dispenser mount and at least one lubricant dispenser that is inserted into the mounting hole and attached to the protective part, with the protective part projecting past a footprint of the lubricant dispenser.

Preferably, the lubricant dispenser is inserted in its hole with radial play, so that, according to an especially preferred embodiment of the invention, the above-mentioned protective casing described can be provided around the lubricant dispenser itself to enclose the lubricant dispenser above the protective part and be inserted with the lubricant dispenser into the hole. Particularly, the protective casing rests with a lower edge, preferably around its entire periphery, on the protective part.

In addition or alternatively to the protective casing, a support collar can also be provided in the lower region of the lubricant dispenser. It is possible for the support collar, in order to increase stability, to be provided between the lubricant fitting and the lubricant dispenser as a connecting member. Furthermore, it is also possible for the support collar to merely form a slip-on protective body that is provided around an outlet of the lubricant dispenser.

BRIEF DESCRIPTION OF THE DRAWING

The above and other objects, features, and advantages will become more readily apparent from the following description, reference being made to the accompanying drawing in which:

FIG. 5 is a perspective view of the bracket for holding two unillustrated dispensers;

FIG. 11 is a perspective view from below of the arrangement of FIGS. 8 and 9;

FIG. 13 shows the protective casing provided on a lubricant dispenser without a bracket.

SPECIFIC DESCRIPTION OF THE INVENTION

Figure 1:
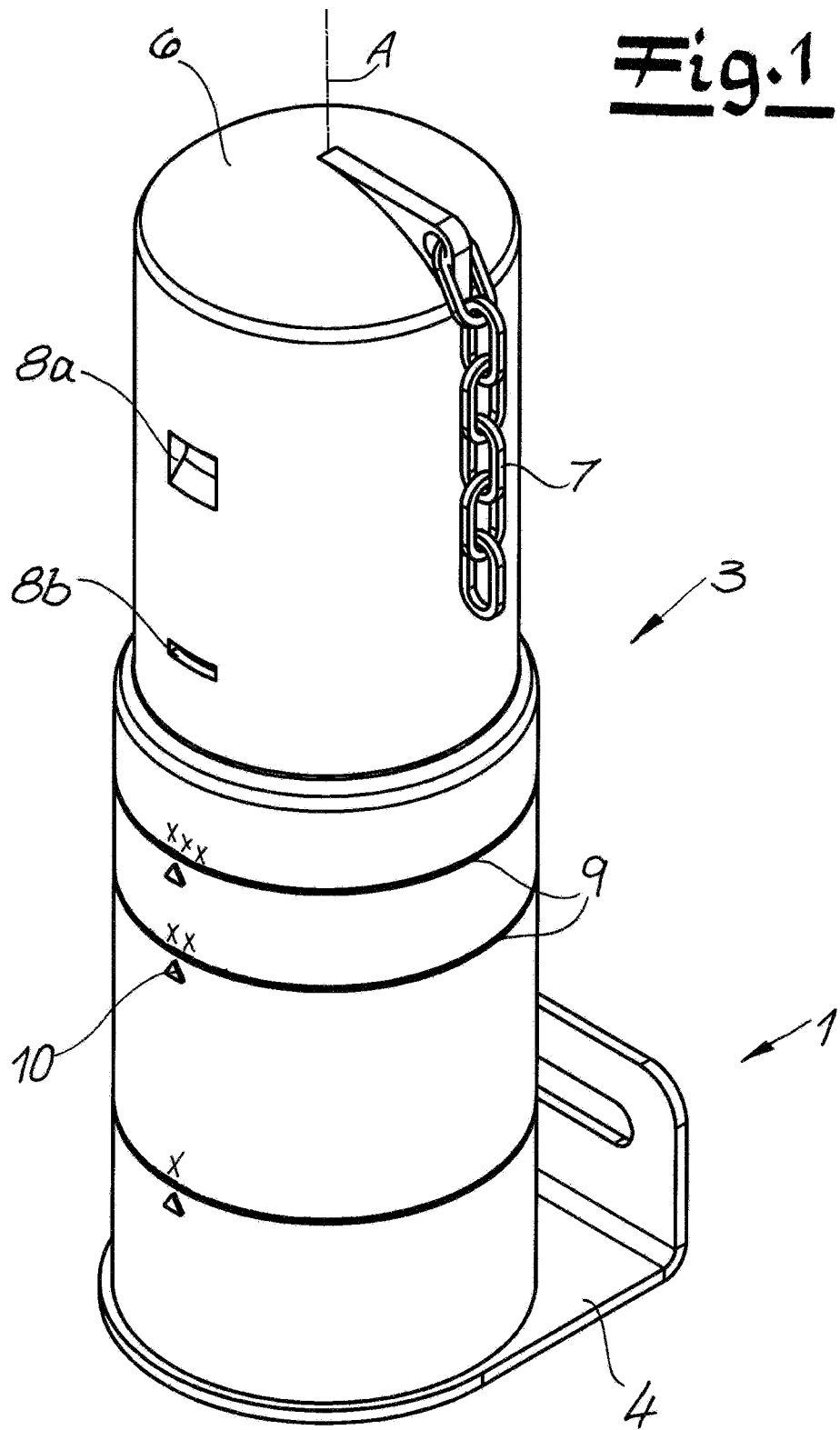
FIG. 1 is a perspective view from above of a dispenser a mount with a bracket, and a protective casing.

As seen in FIG. 1 a lubricant dispenser mount has a bracket 1 for securing at least one lubricant dispenser 2 (see FIG. 2) to an unillustrated support. A separate protective casing 3 is fitted over and protects the lubricant dispenser 2. The dispenser 2 and casing 3 are both generally rotation symmetrical to a vertical axis A.

Figure 2:
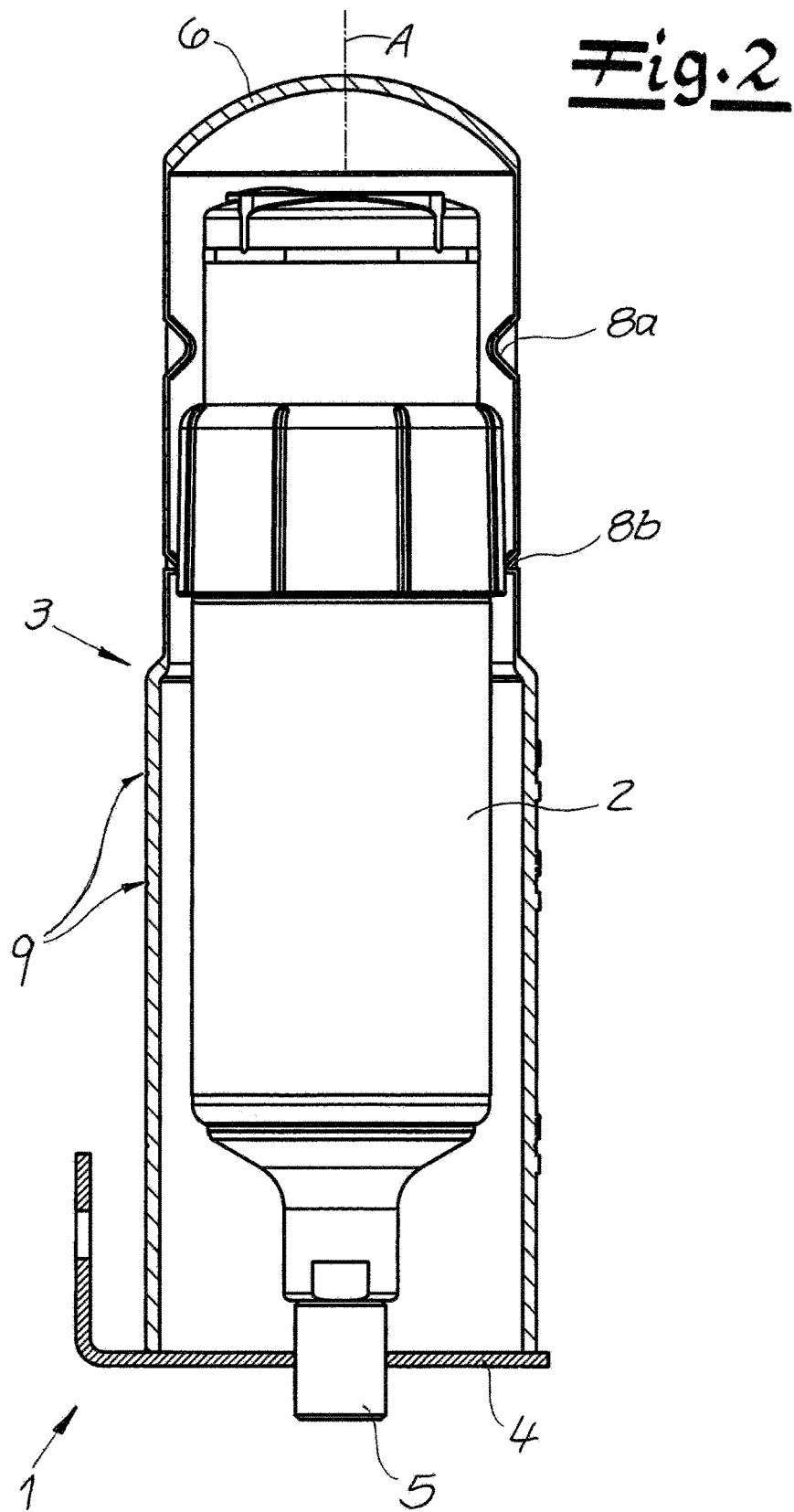
FIG. 2 is a vertical section through the assembly of FIG. 1 also showing the contained dispenser.

Additional details of the protective casing 3 and the exact arrangement of the lubricant dispenser 2 within the protective casing can be seen from the sectional view according to FIG. 2. The protective casing 3 forms a cylindrical cavity for the lubricant dispenser 2, the bracket 1 having a lower leg 4 with at least one lubricant fitting 5. Moreover, it can be seen from a comparison of FIGS. 1 and 2 that the protective casing 3 rests with a lower edge on the lower leg 4 of the bracket 2.

In the illustrated embodiment, the protective casing 3 is approximately circular and cylindrical and has a convex, spherical, or part-spherically upper end 6. On the one hand, the convex upper end 6 results in better stability for the protective casing 3, while falling particles and impacts are also kept off and possibly also deflected laterally away to a certain extent.

According to FIG. 1, a safety chain 7 provided on the upper end 6 holds the separate protective casing 3 when it is removed from the bracket 1 and the lubricant dispenser 2, for example for replacement or maintenance purposes. The safety chain is attached in an appropriate location on the bracket 1 or near the bracket to a support.

The protective casing 3 can be made from various materials, with plastic and metal being particularly worthy of consideration. Metal offers the advantage that the protective casing 3 has more weight and therefore rests more reliably on the bracket 1. On the other hand, an embodiment with plastic results in lower costs and, particularly in contrast to the view according to FIG. 1, the use of a transparent material is also made possible, so that the lubricant dispenser itself then remains visible. A transparent protective casing 3 is advantageous if the fill level of the lubricant dispenser 2 is to be read directly on a lubricant reservoir and/or on a display.

Moreover, it can be seen from FIG. 2 that the protective casing 3 is provided with inwardly oriented projections 8a, 8b. In the arrangement according to FIG. 2, the lower projections 8b bear laterally against the lubricant dispenser 2 while the upper projections 8a are free. As a result of the lower projections 8a, movement of the protective casing 3 in the lubricant dispenser 2 is limited.

With reference to FIG. 13, the combination of projections 8a, 8b also enables, in principle, the protective casing 3 to be fitted on a lubricant dispenser without a bracket 1. The protective casing 3 is then held by the projections 8a, 8b in a form-fitting matter, the projections 8a being provided above and the projections 8b below a cover of the lubricant dispenser 2.

Since, according to FIGS. 1 and 2, the protective casing 3 rests on the lower leg solely as a result of its inherent weight, a good seal is achieved on the lower edge of the protective casing 3. Furthermore, the protective casing 3 can also have a different diameter and a different wall thickness. Accordingly, the protective casing 3 is of lesser all thickness in an upper portion of the cavity than in a lower portion of the cavity.

It can also be seen from FIG. 1 that the protective casing 3 is provided with circumferential grooves 9 and with indicia 10 on the grooves 9. The reason for this is that, while different types of lubricant dispenser 2 often have the same diameter, they have different lengths. In the lubricant dispenser 2 shown in FIG. 2, for example, a lubricant reservoir of different length can be present. To enable the lubricant dispenser 2 to be shortened as needed, the grooves 9 are provided at which the protective casing 3 can be shortened. For example, the protective casing 3 can be sawed off to the desired length, and the marking enables correlation with the various types of dispenser 2.

Figure 3A:
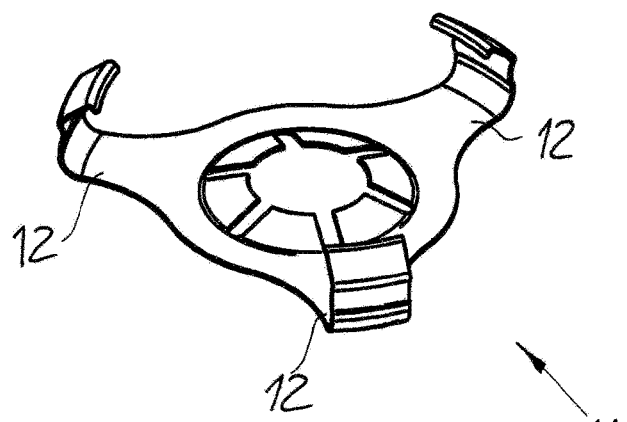
FIG. 3A is a perspective view from above of a first embodiment of a centering member.
Figure 3B:
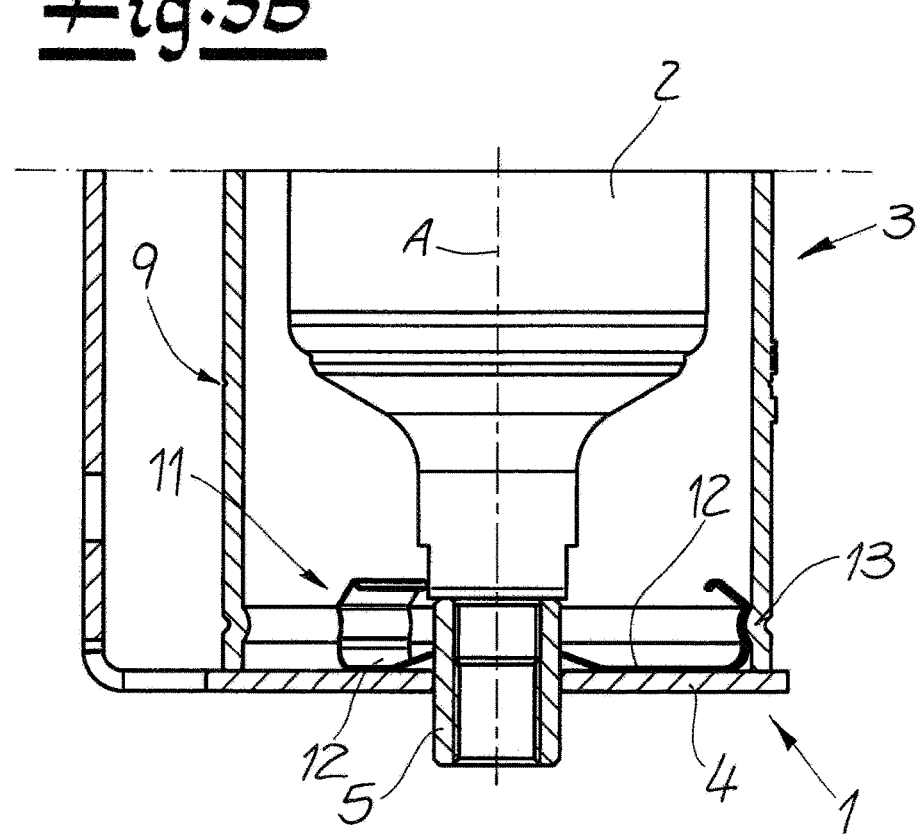
FIG. 3B is a vertical section through the lower region of the mount of FIG. 1 fitted with the centering member of FIG. 3A.

Optionally, a centering member 11 can also be provided in order to securely position the protective casing 3 on the bracket 1. The centering member 11 is particularly embodied such that it impedes the protective casing from lifting. FIGS. 3A and 3B show different centering members 11. What the two different centering members 11 have in common is that they are centered on a middle section at the tubular lubricant fitting 5. With that as a point of departure, FIG. 3A shows an embodiment of the centering member made of sheet metal with lateral tabs 12 that are bent at their ends first upward and then inward.

FIG. 3B shows the described centering member in the installed state. While the middle of the centering member is clamped to the lubricant fitting 5, the tabs 12 hold the protective casing 3. For this purpose, according to the embodiment of FIG. 3B, a circumferential ridge 13 is formed on the inside of the protective casing 3 that is held by the resilient tabs 12 in a form-fitting matter.

Figure 4A:
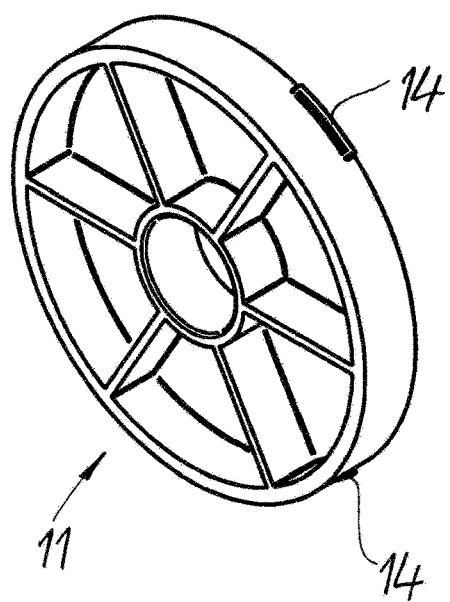
FIG. 4A is a perspective view of a second embodiment of a centering member.
Figure 4B:
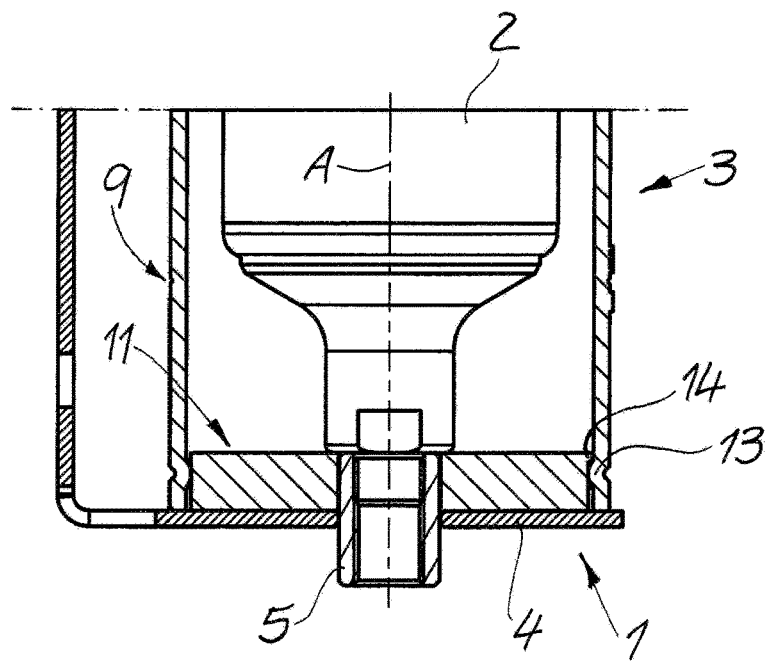
FIG. 4B is a view like FIG. 3B, but with the centering member of FIG. 4A.

In contrast, the centering member 11 according to FIG. 4 is a disk and has individual detents 14 distributed around its periphery. A similar fixation of the protective casing 3 is shown according to FIG. 4B as with the above-described centering member 11, although the individual detents 14 distributed around the periphery engage behind the ridge 13 formed on the protective casing 3. The disk-shaped centering member 11 according to FIG. 4B can protect the interior of the protective casing 3 from the entry of dirt.

FIG. 5 shows an especially preferred embodiment of the bracket 1 that is provided for the fixation of a maximum of two lubricant dispensers 2 to a support.

According to FIG. 5, the bracket 1 is C-shaped seen from the side, with a fastening plate 16 with mounting holes 15 on the rear side, an upper leg 17, and a lower leg 4, the legs 4 and 17 projecting unitarily and perpendicularly from the fastening plate 16 in a horizontal longitudinal direction x.

Figure 6:
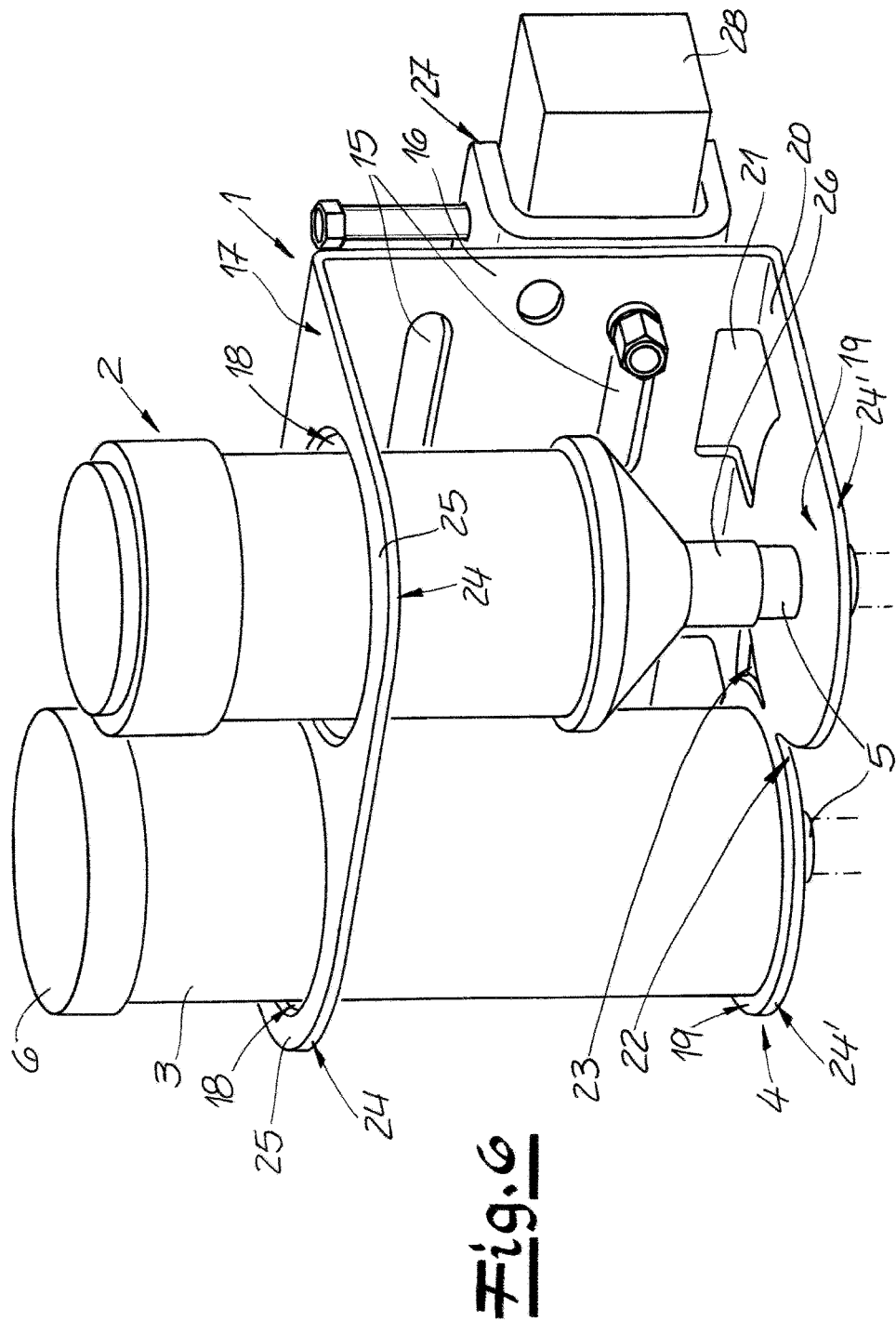
FIG. 6 is a perspective view of the bracket of FIG. 5 fastened to a support and fitted with two dispensers, one of which has a casing.

In the illustrated embodiment, the upper leg 17 has two holes 18 for respective lubricant dispensers 2 (FIG. 6).

Beneath each hole 18 of the upper leg 17, the lower leg 4 has a respective circular protective part 19. The lower leg 4 is thus formed from the two circular protective parts 19 and webs 20 that connect them to the fastening plate 16.

Accordingly, an aperture 21 is formed at the corner between the fastening plate 16 and the lower leg 4 at the two protective parts 19 that prevents the accumulation of dirt there and also enables the dirt to be discharged.

In addition, this effect is enhanced by the fact that, starting from the circular shape of the two protective parts 19, an indentation 22 is formed on the one hand on the free end of the lower leg and, on the other hand, an additional aperture 23 is formed toward the fastening plate 16.

It can be seen from FIG. 5 that the upper leg 17 and the lower leg 4, when seen in the longitudinal direction x, each extend away from the fastening plate 16 to a free end provided with corner roundings 24 and 24'. These corner roundings 24 and 24' extend over at least a third of the length of the upper leg 17 and of the lower leg 4 in the longitudinal direction x.

In particular, the corner rounding 24 on the upper leg 17 is concentric to the respective hole 18, thus resulting in a web 25 of constant width around about a quarter circle. This web 25 provides sufficient protection to the respective lubricant dispenser 2. Moreover, a very large region of the upper leg 17 and of the lower leg 4 is rounded off, so that a laterally impacting object or a laterally impacting person can be better deflected, and the danger of damage is reduced both for the lubricant dispenser 2 on the one hand and for the impacting object or person on the other hand.

By comparing FIGS. 5 and 6 it can be seen that the lubricant dispenser 2 is inserted into the hole 18 with lateral play, and the lubricant dispenser 2 is secured to the protective part 19.

In order to discharge the lubricant from the lubricant dispenser 2 and enable attachment, the protective parts 19 of the lower leg 4 each have a lubricant fitting 5 that is formed in the illustrated embodiment by a separate sleeve connected to the protective part 19.

Furthermore, it can be seen in the embodiment according to FIG. 6 that the lubricant dispenser 1 is not provided directly with the unillustrated outlet on the lubricant fitting 5. Rather, a support collar 26 is located on the lubricant fitting 5 that provides protection and stiffening as an additional element and is arranged as a connecting member between the lubricant fitting 5 and the lubricant dispenser 2. Alternatively, the support collar 26 can also be made such that it is merely surrounds the unillustrated outlet of the lubricant dispenser 2 without functioning in the described manner as an intermediate element.

Figure 7:
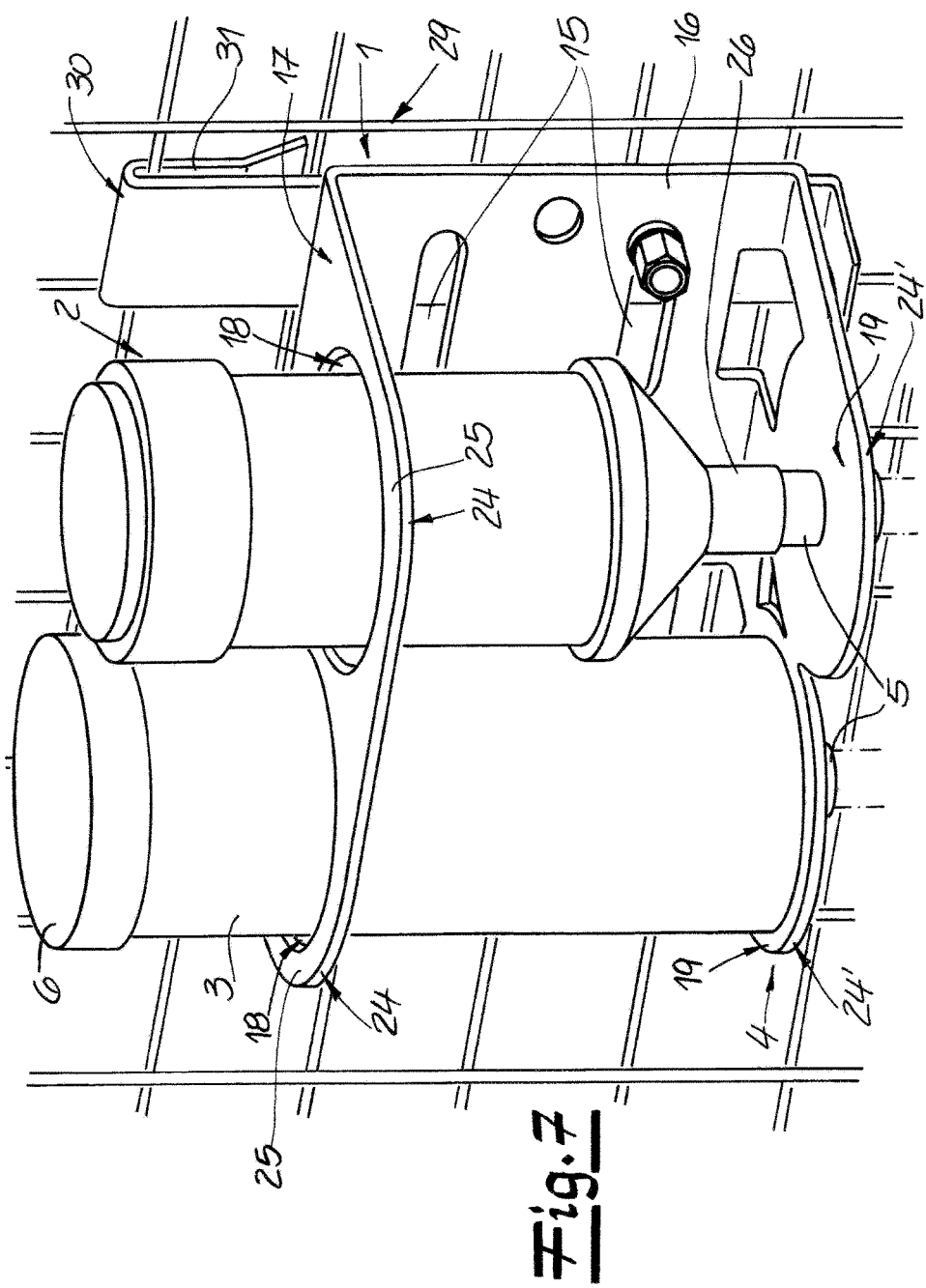
FIG. 7 shows the bracket as in FIG. 6, but suspended by fastening hooks on a lattice.

In order to illustrate the variants that can be considered within the scope of the invention, FIGS. 6 and 7 show different types of attachments for the bracket 1, one of the two lubricant dispensers 2 being covered by a substantially cylindrical protective casing 3. The protective casing 3 encloses the lubricant dispenser 1 above the protective part 19 and is inserted together with the lubricant dispenser 2 into the respective hole 18. The additional protective casing 3 provides even further improved protection. Large, flat objects are kept away by the upper leg 17 and the lower leg 4 and particularly by the corner roundings 24 and 24' formed on them. In order to also achieve better protection against smaller or sharper-edged objects, the protective casing 3 shown in FIGS. 2 and 3 can be used. If this is useful depending on use conditions, all of the lubricant dispensers 2 in the lubricant dispenser mount are usually provided with a respective protective casing 3. FIGS. 5 to 8 show a simplified embodiment of the protective casing 3 with a planar upper end 6. However, the protective casing is preferably embodied according to the design of FIGS. 1 to 4.

Except for the lubricant fitting 5, the entire lubricant dispenser mount is formed from a single metal sheet by stamping and bending. Preferably, a high-quality steel sheet is used in order to prevent corrosion over the long term and ensure a long service life of the lubricant dispenser mount. In addition or alternatively, the lubricant dispenser mount can also be provided with a protective layer in the form of a powder coating, a layer of paint or galvanizing.

According to FIG. 5, the fastening plate 16 has mounting holes 15 formed as slots that are provided in pairs next to and above each other. This results in very different possibilities for attachment.

According to FIG. 6, for example, the bracket 1 can be attached to a horizontal profile 28 with two anchor clips 27 provided next to each other. However, the mounting holes 15 in the form of slots also enable an arrangement of the (appropriately rotated) anchor clips 27 one above the other or also offset at an angle in order to enable attachment of the bracket 1 to a correspondingly oriented profile.

In contrast, FIG. 7 shows the attachment of the bracket 1 to a lattice 29 by attachment hooks 30 that are screwed to the fastening plate 16 and that hang with hooks 31 on the lattice 29.

Figure 8:
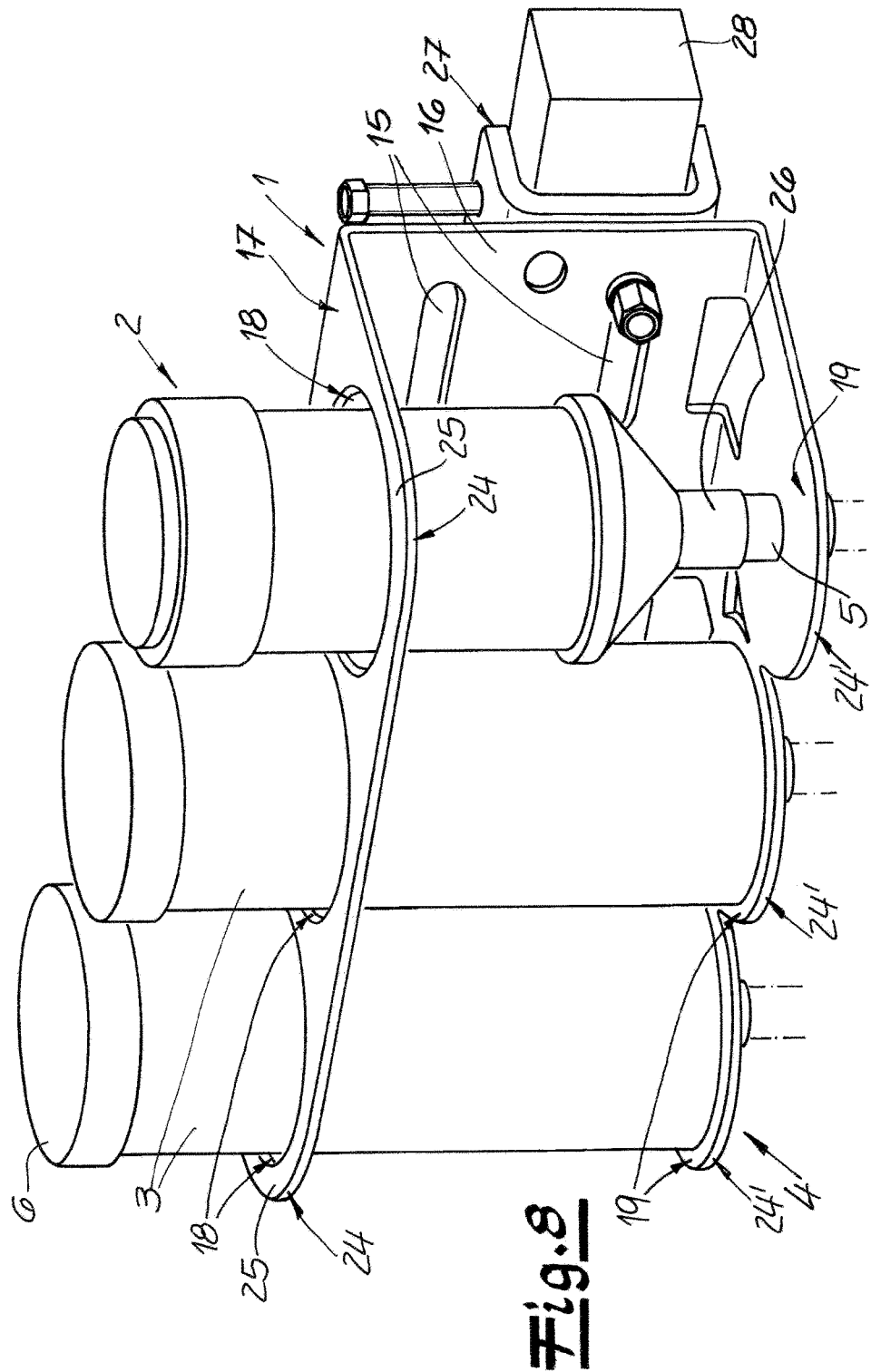
FIG. 8 is a view like FIG. 6, but with a bracket holding three dispensers of which one is not covered by a casing.
Figure 9:
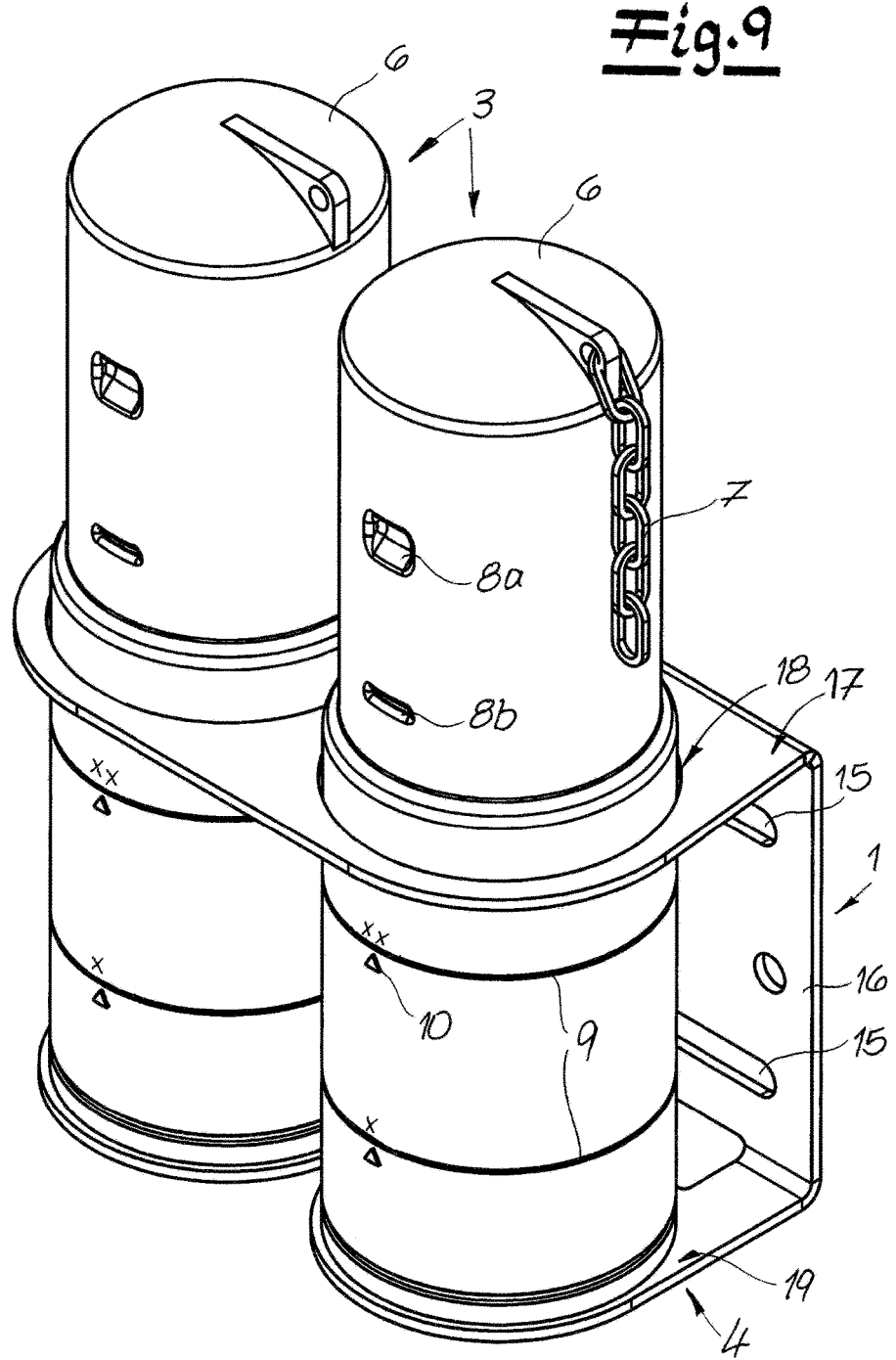
FIG. 9 is a perspective view of the dual-dispenser bracket of FIG. 5 holding two dispensers covered by second embodiments of the casings of this invention.
Figure 10:
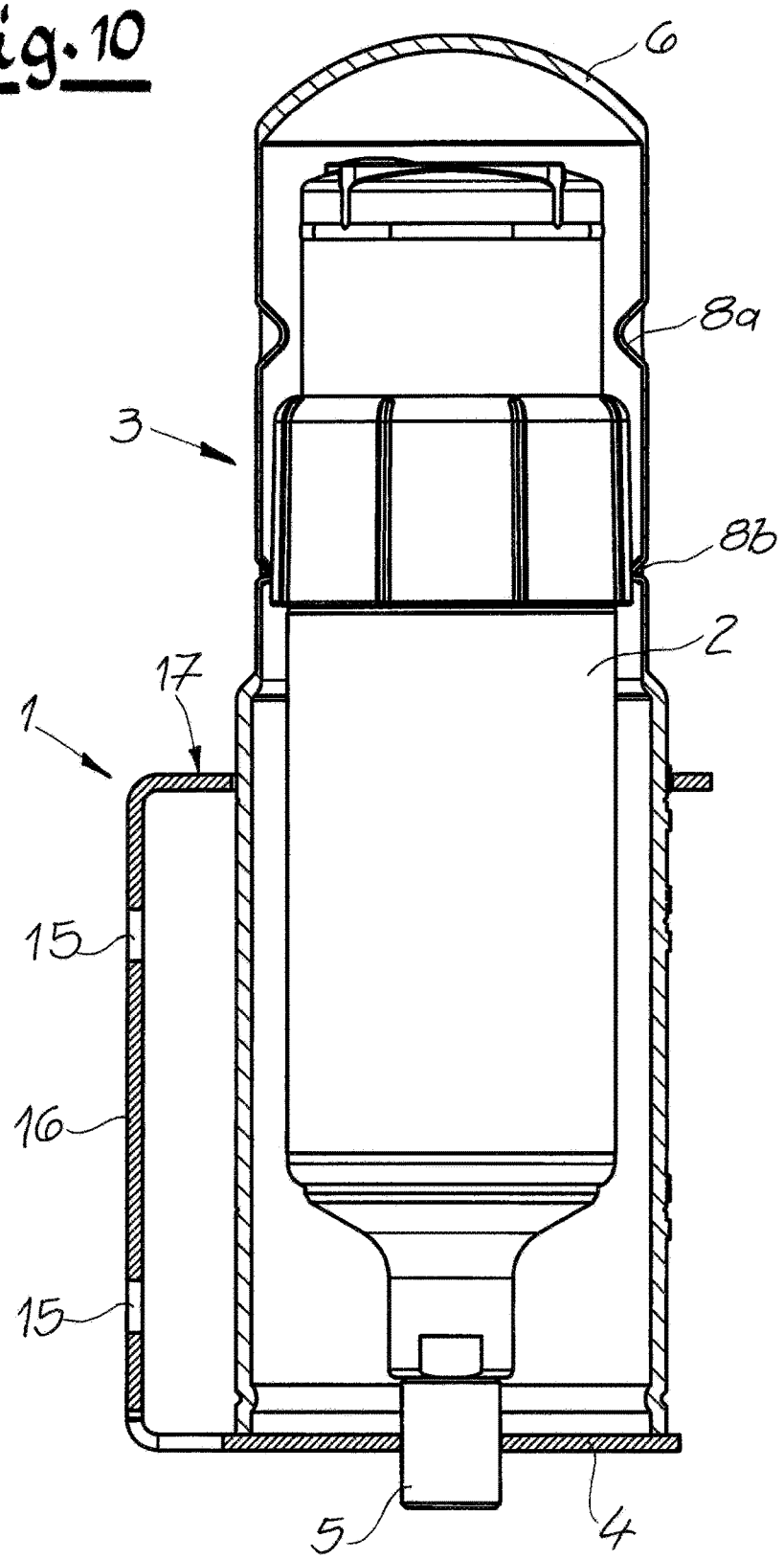
FIG. 10 is a vertical section through one of the dispensers of FIG. 9.

In relation to the invention, the lubricant dispenser mount can be set up for accommodating only one lubricant dispenser or a plurality of lubricant dispensers. FIG. 8 shows an example of a lubricant dispenser mount with a bracket 1 for three lubricant dispensers 2 provided next to each other, with a corresponding number of holes 18 also being present on the upper leg 17 as well as protective parts 19 on the lower leg 4.

In an view like FIGS. 1 and 2, FIGS. 9 and 10 show a combination of the preferred embodiment of protective casings 3 with an especially preferred embodiment of the bracket 1 according to FIG. 5.

As another variant, a provision can be made that—as shown in FIG. 11—the lower leg 4 has holes 32 beneath the cavity, with various types of holes 32 being shown in FIG. 11 for the sake of example. The holes 32 enable dirt to be discharged that may have gotten in from the side or otherwise.

For such an embodiment of the bracket 1 with holes 32 on the lower leg 4, a specially adapted centering member 11 can also be provided.

Figure 12A:
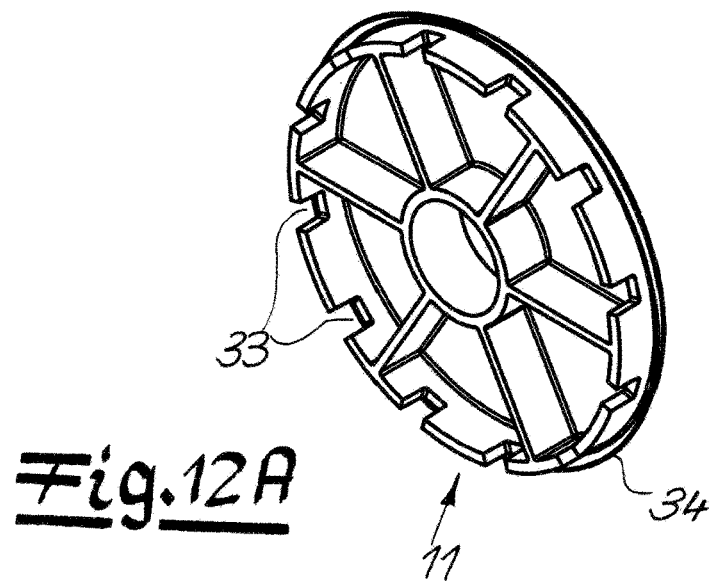
FIG. 12A shows a centering member adapted to the assembly of to FIG. 11.
Figure 12B:
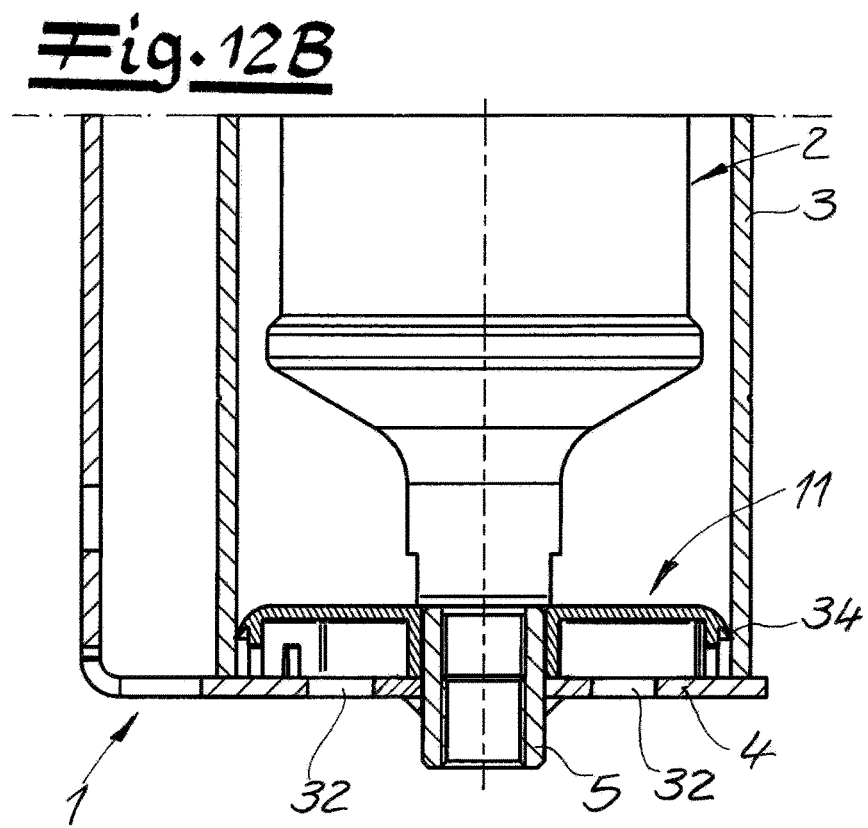
FIG. 12b is a view like FIG. 3b but the centering member according to FIG. 12a when installed.

FIGS. 12a and 12b show such a special centering member 11. Taking a centering member as shown in FIG. 4A as a point of departure, edge notches 33 are provided that enable dirt and moisture to be discharged from the lower edge region. Moreover, the centering member 11 in the form of a disk can also be outfitted with a circumferential, integrally formed seal lip 34 in order to facilitate the fitting of the protective casing 3 while also providing a seal.

I claim:

1. In combination:
a generally cylindrical lubricant dispenser centered on an upright axis and having on the axis a downwardly open outlet fitting;
a bracket formed unitarily wholly from sheet metal with
an upright wall plate provided with formations for attachment to a support and having an upper edge and a lower edge,
an upper leg projecting horizontally from the upper edge and formed with a hole through which extends the dispenser with the outlet fitting projecting downward, and
a lower leg projecting horizontally from the lower edge and forming a protective part having an area equal to at least 80% of the hole, the upper and lower legs both having rounded outer corners remote from the plate extending arcuately toward the plate over at least a third of a horizontal projection of the respective leg from the plate, the lower leg and the upright wall plate being formed with a throughgoing aperture at the lower edge of the upright wall plate between the plate and the lower leg;
a feedthrough fitting in the lower leg engaged with the outlet fitting and supporting the dispenser by upward engagement with the outlet fitting; and
a protective casing forming a cavity adapted to hold the dispenser and having a lower end sitting on the lower generally horizontal leg of the bracket and inwardly oriented projections in the cavity for gripping the lubricant dispenser.

2. The combination defined in claim 1, wherein the casing is generally cylindrical, centered on an upright axis, and has an upwardly convex upper end.

3. The combination defined in claim 1, wherein the casing is at least partly transparent.

4. The combination defined in claim 1, wherein the lower leg is formed with vertically throughgoing holes beneath the cavity.

5. The combination defined in claim 1, wherein the hole is circular and a radius of the corner rounding on the upper leg is greater than or equal to a radius of the hole.

6. The combination defined in claim 1, wherein the protective part is circular and the lower leg has connecting webs that connect the protective part to the wall plate.

7. The combination defined in claim 1, wherein the upper leg is formed with at least two of the holes next to each other and the lower leg has at least two of the protective parts next to each other and each beneath a respective one of the holes of the upper leg, each hole and the respective protective part being adapted to receive a respective one of the dispensers.

8. In combination:
a generally cylindrical lubricant dispenser centered on an upright axis and having on the axis a downwardly open outlet fitting;
a bracket formed unitarily wholly from sheet metal with
an upright wall plate provided with formations for attachment to a support and having an upper edge and a lower edge,
an upper leg projecting horizontally from the upper edge and formed with a hole through which extends the dispenser with the outlet fitting projecting downward, and
a lower leg projecting horizontally from the lower edge and forming a protective part having an area equal to at least 80% of the hole, the upper and lower legs both having rounded outer corners remote from the plate extending arcuately toward the plate over at least a third of a horizontal projection of the respective leg from the plate, the lower leg and the upright wall plate being formed with a throughgoing aperture at the lower edge of the upright wall plate between the plate and the lower leg;
a feedthrough fitting in the lower leg engaged with the outlet fitting and supporting the dispenser by upward engagement with the outlet fitting; and
a protective casing forming a cavity adapted to hold the dispenser and having a lower end sitting on the lower generally horizontal leg of the bracket, the casing being of lesser wall thickness in an upper region of the cavity than in a lower region of the cavity.

9. The combination defined in claim 1, further comprising:

a centering member on the lower leg of the bracket and in the cavity for aligning the casing on the bracket.

10. The combination defined in claim 9, further comprising
a snap connection or a seal connecting the casing and the centering member.

11. In combination:
two generally cylindrical lubricant dispenser centered on respective upright axes and each having on the respective axis a downwardly open outlet fitting;
a bracket formed unitarily wholly from sheet metal with
an upright wall plate provided with formations for attachment to a support and having an upper edge and a lower edge,
an upper leg projecting horizontally from the upper edge and formed with two holes through each of which extends a respective one of the dispensers with the respective outlet fitting projecting downward, and
a lower leg projecting horizontally from the lower edge and forming two protective parts each beneath a respective one of the holes and having an area equal to at least 80% of the respective hole, the upper and lower legs both having rounded outer corners remote from the plate extending arcuately toward the plate over at least a third of a horizontal projection of the respective leg from the plate, the lower leg and the upright wall plate being formed with a throughgoing aperture at the lower edge of the upright wall plate between the plate and the lower leg, each hole and the respective protective part being adapted to receive a respective one of the dispensers, the lower leg being formed between the protective parts with an aperture and with an indentation formed on a free end of the lower leg; and
two respective feedthrough fittings in the lower leg engaged with the outlet fittings of the dispensers and supporting the dispensers by upward engagement with the outlet fittings.

* * * * *